Dec. 3, 1957  R. H. CULLEN ET AL  2,815,227
PREPOSITIONED COUPLING FOR SWAGED CONNECTIONS
Filed July 11, 1955
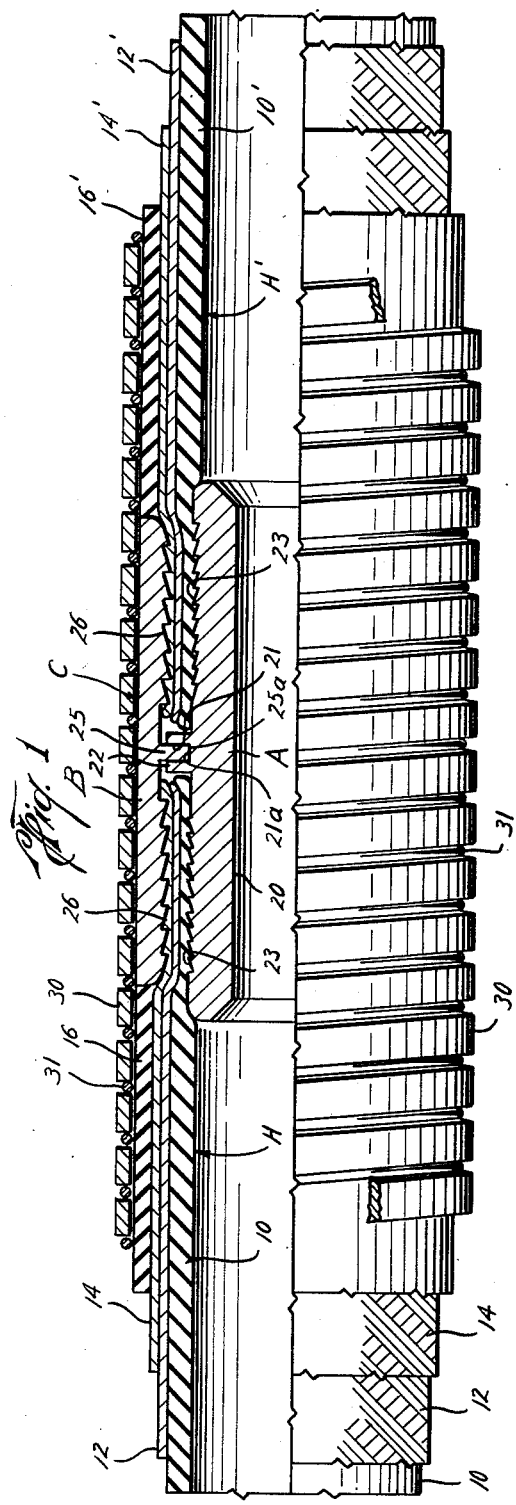
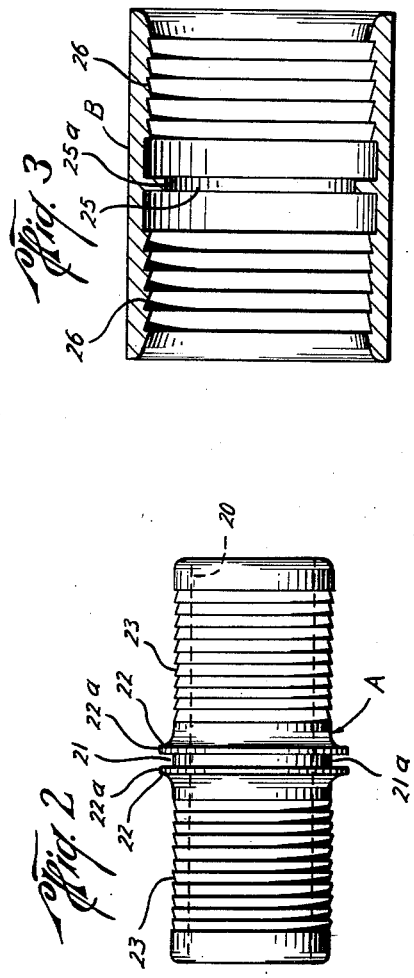
Roy H. Cullen
Leslie D. Richards
INVENTOR.
BY J. Vincent Martin
Joe E. Edwards
B. R. Pravel
ATTORNEYS

2,815,227

PREPOSITIONED COUPLING FOR SWAGED CONNECTIONS

Roy H. Cullen and Leslie D. Richards, Houston, Tex.; said Richards assignor to said Cullen Application July 11, 1955, Serial No. 521,251

4 Claims. (Cl. 285—23)

This invention relates to new and useful improvements in couplings for flexible supports or hoses and methods of attaching same.

An object of this invention is to provide a new and improved coupling for a flexible support or hose, and the method of attaching same, wherein the coupling is of a self-aligning construction which is adapted to locate and hold the parts of the coupling together prior to and during the connection of the coupling to the flexible support or hose.

An important object of this invention is to provide a new and improved intermediate coupling for securing together the ends of adjacent sections of a flexible support or hose, and a method of attaching same, wherein an inner coupling member is adapted to be positioned internally of the ends of the sections of the flexible support or hose and an outer coupling member is adapted to be positioned externally of the ends thereof, with means being provided on the inner and outer coupling members for aligning same so as to properly clamp the ends of the support or hose between the members.

Another object of this invention is to provide a new and improved coupling for a flexible support or hose and a method of attaching same, wherein an outer coupling member is adapted to be initially aligned over an inner coupling member so as to maintain such members in a fixed longitudinal position with respect to each other, whereby a subsequent swaging force can be applied to the outer member for clamping the ends of adjacent sections of the flexible support or hose between the members.

The construction designed to carry out the invention will be hereinafter described, together with other features thereof.

The invention will be more readily understood from a reading of the following specification and by reference to the accompanying drawings forming a part thereof, wherein an example of the invention is shown and wherein:

Figure 1 is a view, partly in elevation and partly in section, illustrating the coupling of this invention in its assembled position with adjacent sections of a flexible support or hose.

Figure 2 is an elevation of the inner coupling member of the coupling of this invention.

Figure 3 is a sectional view of the outer coupling member of the coupling of this invention.

In the drawings, the letter C designates generally the coupling of this invention, and the letters H and H' designate adjacent sections of a flexible support or hose of the type illustrated more particularly in the U. S. patent application of Roy H. Cullen and Leslie D. Richards, Serial No. 462,159, filed October 14, 1954. Although the coupling C of this invention is not limited in its use to the particular flexible support or hose construction illustrated in this application or in the above identified application, it should be pointed out that the coupling C of this invention is particularly adapted for use with such hose constructions.

The support or hose section H illustrated in the drawings includes an inner tubular conduit 10 which is formed of rubber or other similar elastic resilient material and which serves as the main conductor through which fluid flows during the use of the support or hose. Wire braid layers 12 and 14 surround the fluid conduit 10 and are of substantially the same length. Externally of the wire braid layer 14, another tubular member 16 is provided which is formed of rubber or other resilient material and which is of a somewhat shorter length than the conduit 10 and the wire braid layers 12 and 14 so that such layer or tubular member 16 is not clamped by the coupling C, as will be more evident hereinafter. The members 10', 12', 14' and 16' of the hose section H' are of the same construction as members 10, 12, 14 and 16 of the hose H, respectively.

The coupling C includes an inner coupling member A and an outer coupling member B. The inner coupling member A is of a tubular construction and has an open inner bore or passage 20 through which fluid is adapted to flow from the hose sections H and H' when the coupling C is attached to such sections. On the external surface of the inner coupling member A, there is formed an annular groove or recess 21 between a pair of annular outwardly extending ribs 22. Such ribs 22 are either formed integrally with the inner coupling member A or are secured thereto in any suitable manner so as to form a part thereof. Annular teeth 23 are formed on each side of the ribs 22 and such teeth 23 extend upwardly and inwardly toward the ribs 22. Such teeth 23 are adapted to engage with the inner surface of the fluid conductor or conduit 10 and the fluid conductor or conduit 10'.

The outer coupling member B is also in the form of a sleeve and such member B includes an annular inwardly extending flange 25, which, as will be explained, is adapted to fit within the groove 21 to align the outer coupling member of sleeve B with the inner coupling member A prior to the swaging of the outer coupling B into its final assembled position. The coupling member B also includes gripping teeth 26 on each side of the centrally disposed flange or rib 25. Such teeth 26 are inclined downwardly and inwardly toward such flange 25 and are adapted to engage either the outer surface of the wire braid 14 or the outer surface of the wire braid 14' (Figure 1) after the coupling member B has been swaged on the member A, as will be explained.

Figure 3 illustrates the outer coupling member B prior to the swaging or inward squeezing or compression thereof about the ends of the adjacent hose sections H and H', while Figure 1 illustrates the outer coupling member B after it has been swaged or compressed inwardly to clamp the ends of the hose sections H and H' between the teeth 26 on the member B and the teeth 23 on the member A. It is important to note that the flange 25 and ribs 22 are sized for a "press fit" or a "restricted interference fit" wherein the internal diameter of the inner surface 25a of the flange 25 is slightly smaller than the external diameter of the external surface 22a of each of the ribs 22 on the members A whereby the member B must be forced or pressed onto the inner member A in order to pass the flange 25 longitudinally over one of the ribs 22, as will be more fully explained. Also, such construction results in a snapping action as the flange 25 moves into the groove 21 which is an indication to the man assembling the members A and B that they are properly aligned. The ribs 22 thereafter prevent the flange 25 from being displaced from the groove 21 during the final assembly of the hose with the coupling. Thus, such self-aligning construction maintains the outer member B in a fixed position relative to the inner member A prior to and during the swaging or inward compression of the outer member B to grip the ends of the hose sections H and H'.

Although the coupling C could be utilized with just the portions of the hose sections H and H' previously referred to, it will be noted that a coil spring 30 is illustrated in Figure 1 as surrounding the outer flexible tubes or members 16 and 16' and also the outer coupling member B after it has been swaged into the clamping position. Cords 31 are positioned between the spaces of the coil spring 30 if desired. Also, additional layers (not shown) as desired could be utilized on top of the coil spring 30 in a manner similar to that illustrated in our aforesaid copending patent application Serial No. 642,159.

In the carrying out of the method of this invention to attach the coupling C to the ends of the hose section H and H', the outer coupling member B is initially moved longitudinally over the coupling member A until the inwardly extending annular flange 25 on the outer member B contacts one of the ribs 22 of the member A. When such contact occurs, the outer sleeve B is forced or pressed in a direction to move the flange 25 toward the groove 21. The flange 25 is sufficiently flexible to yield or flex under such force or pressing to permit the flange 25 to pass over the rib 22 with which it is engaged and then to slip into the groove 21. As soon as the flange 25 moves into the groove 21, a snapping action occurs which makes it evident to the operator that such sleeve is in its aligned position with the flange 25 in the groove 21, so that further forcing or pressing is stopped to prevent moving the flange 25 over the other of the ribs 22.

Thereafter, the hose section H is manually pushed into the annulus between the members A and B until the layers 10, 12 and 15 are in contact with one of the ribs 22. Likewise, the hose H' is inserted over the other end (Figure 1) of the inner coupling member A until the layers 10', 12' and 14' contact the other rib 22. During such assembly of the hose sections H and H', the self-alignment of the members A and B by means of the flange 25 extending into the groove 21 between the ribs 22 prevents a displacement of the members A and B relative to each other. Such feature is important since once the ends of the hose sections H and H' are inserted, it would be otherwise practically impossible to determine whether the members A and B were still aligned for proper swaging. Then, the outer coupling member B is swaged or compressed radially or laterally inwardly so as to cause the inner annular surface 25a of the flange 25 to move into contact with the bottom or inner annular surface 21a of the groove 21. In this connection, it should be pointed out that the width of the flange 25 is ordinarily less than the width of the groove 21 prior to the swaging operation (Figures 2 and 3), but after the swaging operation, the flange 25 is deformed to the extent that it fills, or substantially fills, the entire groove 21 so that the coupling members A and B are effectively joined together and thereafter may be considered a unitary assembly. It will be appreciated that such construction greatly strengthens the coupling with the ends of the hose sections H and H'. Also, the swaging of the outer member B results in the forcing of the teeth 23 and 26 into the layers 10, 10', 14 and 14' so that the ends of the hose sections H and H' are securely clamped against longitudinal movement away from the coupling C.

In connection with the foregoing method, it should be noted that the tubular members 16 and 16' are in position on the layers 14 and 14', respectively, prior to the swaging of the outer coupling member B, but the coil spring layer 30 with the cord 31 therebetween is added after the outer coupling member 25 has been swaged into its clamped position (Figure 1). Also, any additional layers which are added would be ordinarily added subsequently to the swaging of the coupling member B.

Although the invention has been described above in connection with an intermediate coupling for securing the ends of hose or tubular support sections together, it will be appreciated that such construction and method can be used in connection with an end coupling wherein the annular flange 25 is disposed at the end of the outer member B and the ribs 22 and the groove 21 therebetween is positioned at the end of the inner coupling member A. However, the necessity for the self-aligning construction of this invention is not nearly so great with an end coupling as with the intermediate coupling illustrated, because with the intermediate coupling, it is practically impossible to determine when the inner and outer members have been aligned prior to swaging. However, with the end coupling, the relative positions of the inner and outer coupling members is ordinarily visible during the swaging operation.

It should also be pointed out that the flange 25 and ribs 22 could be sized for a "slip fit" wherein the inner diameter of the flange 25 is the same, or substantially the same, as the outer diameter of the ribs 22, in which case there would be some slight frictional resistance to the movement of the flange 25 past one of the ribs 22 into the groove 21 by reason of the sliding engagement of the surfaces 25a and 22a. However, such construction is less desirable than the "press fit" described above wherein the inner diameter of the flange 25 is less than the outer diameter of the ribs 22 since the snapping action is not as evident and the retention of the flange 25 in the groove 21 is not as effective as with the "press fit."

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. A coupling for adjacent sections of a hose, comprising an inner coupling member having end portions adapted to fit within the bores of said adjacent sections of the hose, an annular integral solid outer coupling member surrounding said inner coupling member, said outer coupling member being formed of a material which is adapted to be swaged, a pair of annularly disposed ribs on one of said members projecting from such member toward the other member, said ribs being spaced longitudinally from each other to form an annularly disposed groove therebetween, and an annularly disposed flange on the other member, said ribs and said flange having a restricted interference fit whereby the inner coupling member and the outer coupling member may be pressed longitudinally relative to each other to position the ribs and the flange in interlocking engagement with each other and whereby said outer member may be subsequently swaged inwardly to clamp the ends of the hose sections between the inner coupling member and the outer coupling member and to increase said interlocking engagement of said ribs and said flange.

2. A coupling for adjacent sections of a hose, comprising an inner coupling member having end portions adapted to fit within the bores of said adjacent sections of the hose, an annular integral outer coupling member surrounding said inner coupling member, said outer coupling member being formed of a material which is adapted to be swaged, a pair of annularly disposed ribs on one of said members projecting from such member toward the other member, said ribs being spaced longitudinally from each other to form an annularly disposed groove therebetween, an annularly disposed flange on the other member, said ribs and said flange having a restricted interference fit whereby the inner coupling member and the outer coupling member may be pressed longitudinally relative to each other to position the ribs and the flange in interlocking engagement with each other and whereby said outer member may be subsequently swaged inwardly to clamp the ends of the hose sections between the inner coupling member and the outer coupling member and to increase said interlocking engagement of said ribs and said flange, the inner surface of said outer coupling member being radially spaced throughout its length from the corresponding portions of the outer surface of said inner coupling member whereby when said adjacent sections of the hose are positioned between the coupling members, the entire outer member may be swaged inwardly a uniform amount to effectively clamp the ends of said adjacent sections of the hose throughout the area between the coupling members.

3. The structure set forth in claim 2 wherein said annularly disposed ribs and said annularly disposed flange are formed as annular projections on their respective coupling members.

4. The structure set forth in claim 2 wherein said ribs are on the external surface of said inner coupling member, wherein said flange is on the internal surface of said outer coupling member, and wherein said restricted interference fit is provided by forming the inner lateral surface of said flange with a slightly smaller diameter than the external diameter of the outer lateral surfaces on said ribs, whereby said flange is positioned in said groove with a snapping action upon the pressing of the outer coupling member longitudinally relative to said inner coupling member.

References Cited in the file of this patent

UNITED STATES PATENTS

| | | |
|---|---|---|
| 1,329,121 | Hachman | Jan. 27, 1920 |
| 2,121,624 | Cowles | June 21, 1938 |
| 2,341,003 | Watson | Feb. 8, 1944 |
| 2,624,907 | Graham | Jan. 13, 1953 |
| 2,725,246 | Weinhold | Nov. 29, 1955 |